(12) United States Patent
Ma et al.

(10) Patent No.: US 8,886,999 B2
(45) Date of Patent: Nov. 11, 2014

(54) LOW COST ERROR-BASED PROGRAM TESTING APPARATUS AND METHOD

(75) Inventors: Yu-Seung Ma, Daejeon-si (KR); Seon-Tae Kim, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 137 days.

(21) Appl. No.: 13/550,118

(22) Filed: Jul. 16, 2012

(65) Prior Publication Data

US 2013/0055027 A1   Feb. 28, 2013

(30) Foreign Application Priority Data

Aug. 25, 2011   (KR) .......................... 10-2011-0085323

(51) Int. Cl.
*G06F 11/00* (2006.01)
*G06F 11/263* (2006.01)

(52) U.S. Cl.
CPC .................................. *G06F 11/263* (2013.01)
USPC ............. 714/41; 714/38.1; 717/124; 717/131

(58) Field of Classification Search
CPC .......................... G06F 11/3672; G06F 11/3688
USPC .................................................. 714/41, 38.1
See application file for complete search history.

(56) References Cited

U.S. PATENT DOCUMENTS

| 6,701,460 | B1 * | 3/2004 | Suwandi et al. ................. 714/41 |
| 8,381,192 | B1 * | 2/2013 | Drewry et al. ................. 717/128 |
| 8,533,679 | B2 * | 9/2013 | Showalter et al. ............ 717/125 |
| 2003/0126505 | A1 * | 7/2003 | Lacey, III ........................ 714/38 |
| 2006/0129880 | A1 * | 6/2006 | Arcese et al. .................... 714/11 |
| 2008/0134160 | A1 * | 6/2008 | Belapurkar et al. .......... 717/154 |
| 2010/0287412 | A1 * | 11/2010 | Cha et al. ........................ 714/35 |
| 2010/0287535 | A1 * | 11/2010 | Kim et al. ..................... 717/127 |

FOREIGN PATENT DOCUMENTS

KR   10-2010-0121225   11/2010

OTHER PUBLICATIONS

A. Offutt et al., "An Experimental Determination of Sufficient Mutant Operators", 1996, pp. 1-23.

* cited by examiner

*Primary Examiner* — Yolanda L Wilson
(74) *Attorney, Agent, or Firm* — Staas & Halsey LLP

(57) ABSTRACT

A low cost error-based program testing apparatus and method are provided. The testing apparatus according to an embodiment of the present invention generates error programs by adding errors to a test target program, selects a test target error program associated with test data among the error programs using error information obtained through the error addition, receives the test data to execute the test target error program, and tests for presence/absence of the errors. Accordingly, it is possible to reduce a text execution time and testing costs.

6 Claims, 6 Drawing Sheets

FIG. 5

```
int  arithmeticOP [] = {PLUS, MINUS,
                       MULTIPLY, DIVIDE, MOD};

AOR(left_op, right_op, operator_type) {
    switch (operator_type) {
        case PLUS      : return left_op + right_op;
        case MINUS     : return left_op - right_op;
        case MULTIPLY  : return left_op * right_op;
        case DIVIDE    : return left_op / right_op;
        case MOD       : return left_op % right_op;
    }
}

SerialAOR (left, right, original_op) {
    original_result=AOR (left, right, original_op) ;
    for(int i=0 ; i<arithmeticOP . length; i++) {
      if (original_op ! = arithmeticOP [i] ) ;
         mutant_result=AOR (left, right, arOP [i] ) ;
         if ( original_result ! = mutant_result)
            // report the mutant as weakly killed
            report (ID of the mutant) ;
         }
    }
    return original_result ;
}
```

LOW COST ERROR-BASED PROGRAM TESTING APPARATUS AND METHOD

CROSS-REFERENCE TO RELATED APPLICATION

This application claims the benefit under 35 U.S.C. §119 (a) of Korean Patent Application No. 10-2011-0085323, filed on Aug. 25, 2011, the entire disclosure of which is incorporated herein by reference for all purposes.

BACKGROUND

1. Field

The following description relates to computer software, and more particularly, to error-based program testing technology that evaluates quality of a program through error injection.

2. Description of the Related Art

An error-based test is a method that selects test data based on predictive knowledge that error types frequently generated in the past will be frequently generated in a system, a system component, or a program which is currently tested. An error-based testing process can be broken down into a process of generating an error program through error insertion and a process of executing the error program using test data.

When the error program is generated through the process of generating the error program, the generated error program is tested through the process of executing the error program. The error program is executed using a test set that is a set of test data until errors in the error program are detected.

In the error-based testing process, it is costly to execute the error program. That is, the error program is repeatedly executed until the corresponding errors are detected, which makes the error-based testing process very time consuming when there are a large number of error programs to be executed.

The error programs are repeatedly executed with respect to the test data until corresponding errors are detected. This means that the error programs are meaninglessly executed with respect to a large amount of test data until the errors they contain are detected.

Accordingly, there is a need for reducing error-based testing costs by reducing meaningless repetitive execution.

In the conventional art, Korean Patent No. 10-2010-0121225 discloses a low cost software reliability test technique through selective error injection utilization, and U.S. Patent No. 2008-0134160 discloses a software error insertion technique with respect to an error processing routine of Java applications.

SUMMARY

The following description relates to an error-based program testing apparatus and method which reduce a test execution time and testing costs by blocking execution of unnecessary error programs among a large number of error programs when executing the error-based program test.

In one general aspect, there is provided an error-based program testing apparatus, including: an error program generation unit that generates error programs by adding errors to a test target program; a preprocessing unit that selects a test target error program associated with test data among the generated error programs using error information obtained through the addition of the errors; and an error program testing unit that receives the test data and executes the test target error program to thereby test for presence/absence of the errors.

In this instance, the preprocessing unit may include a position information reading unit that reads position information of the error programs, the test data, and error codes included in the error programs; and an execution path analysis unit that ascertains an execution path by executing the test target program for each set of test data, detects an error program that has an error code positioned on the ascertained execution path, and excludes an error program that is not detected from the test target passed through the error program testing unit.

In addition, the preprocessing unit may include an error code reading unit that reads list information of the error programs, the test data, and error codes included in the error programs; an integrated error program generation unit that generates an integrated error program; and an intermediate state analysis unit that executes the integrated error program for each set of test data, detects an error program in which intermediate execution results of an original code and an error code differ, and excludes an error program that is not detected from a test target passed through the error program testing unit.

In one general aspect, there is provided a testing method of an error-based program testing apparatus, the testing method including: generating error programs by adding errors to a test target program; selecting a test target error program associated with test data among the generated error programs using error information obtained through the addition of the errors; and receiving the test data and executing the test target error program to thereby test for presence/absence of the errors.

Other features and aspects will be apparent from the following detailed description, the drawings, and the claims.

BRIEF DESCRIPTION OF THE DRAWINGS

FIG. 5 is a reference diagram illustrating a pseudo-code of a SerialAOR function according to a preferred embodiment of the present invention.

Figure 1:
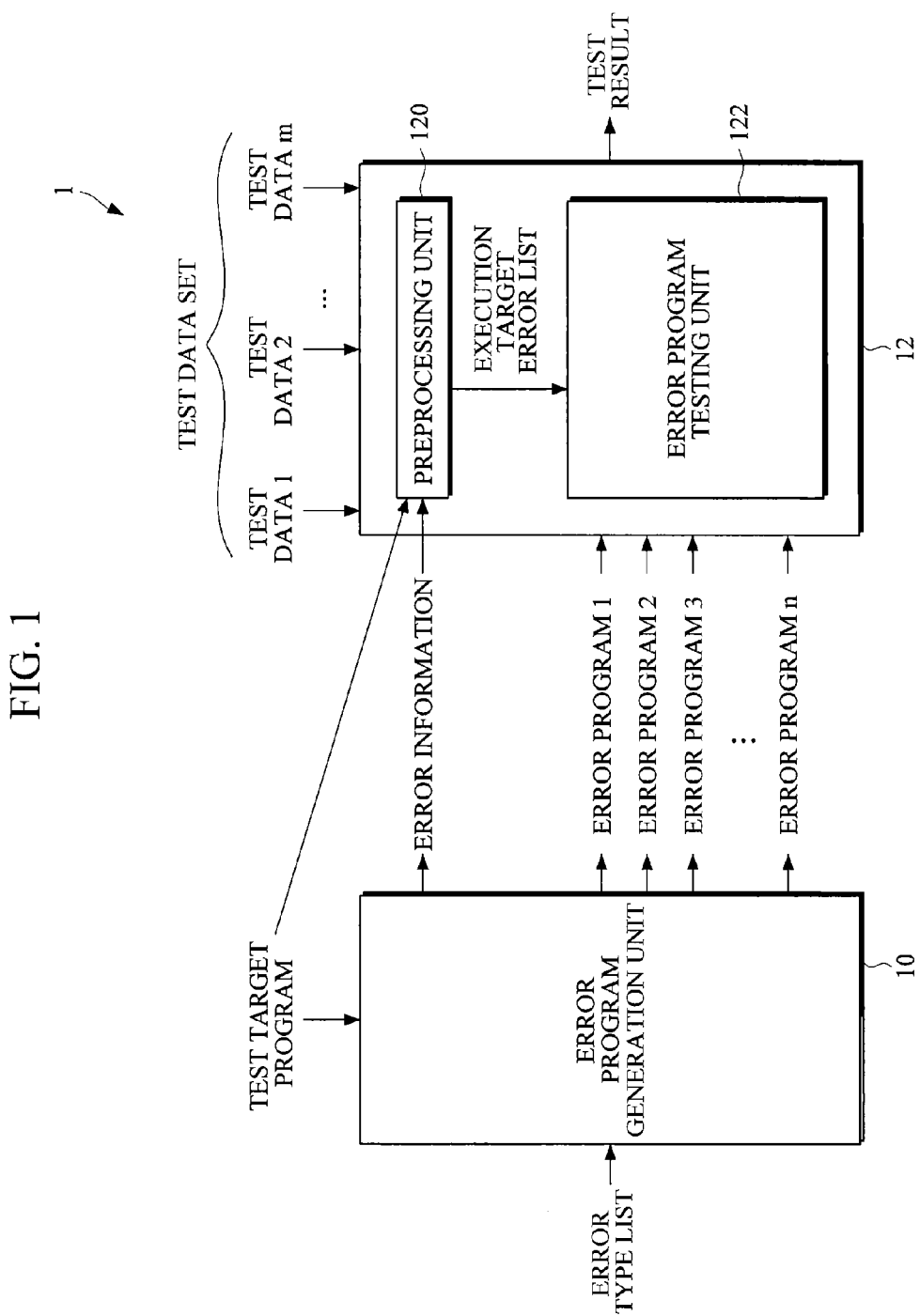
FIG. 1 is a configuration diagram illustrating an error-based program testing apparatus according to a preferred embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

FIG. 1 is a configuration diagram illustrating an error-based program testing apparatus 1 according to a preferred embodiment of the present invention.

Referring to FIG. 1, the error-based program testing apparatus 1 (hereinafter, referred to as "testing apparatus") includes an error program generation unit 10 and an error program execution unit 12.

The error program execution unit 12 includes a preprocessing unit 120 and an error program testing unit 122.

The error program generation unit 10 receives a test target program and an error type list.

Next, the error program generation unit 10 analyzes the test target program, and adds errors corresponding to the error type list to a source code of the test target program to thereby generate error programs including the errors.

The error type denotes an error type predicted to be frequently generated in a system.

In software, the error type corresponds to frequent erroneous use of an arithmetic operator (for example, an arithmetic operator "+" is erroneously used as an arithmetic operator "−"), of a relational operator (for example, a relational operator ">" is erroneously used as a relational operator "≥"), and the like.

Results of the error program generation unit 10 are programs in which errors are inserted, and an error program 1, an error program 2, . . . , and an error program n, which are shown in FIG. 1, denote that a total of n number of error programs are generated.

The preprocessing unit 120 of the error program execution unit 12 reduces the number of the error programs to be tested through the error program testing unit 122. That is, the error program testing unit 122 does not execute all of the error programs with respect to a test data set (test data 1, test data 2, . . . , test data m), and executes only the error programs corresponding to test target lists received from the preprocessing unit 120. For this, the preprocessing unit 120 selects test target error programs associated with the test data among the error programs using error information obtained through the error addition by the error program generation unit 10.

The error information may be position information of error codes included in the error programs or list information.

The preprocessing unit 120 selects the error programs in which an error could possibly be detected by the test data. To cause a problem in a program by errors in code, ① an error code is required to be executed, ② an intermediate state of the program is required to be changed by an error code execution result, and ③ the changed state of the program is required to affect a final execution result.

Accordingly, when the error code is not executed, or the error code execution result does not change the intermediate state of the program, the problem in the program is not caused. That is, executing the error programs under the above-described conditions is meaningless.

In the present invention, based on the above facts, two techniques are suggested to enable the preprocessing unit 120 to extract an error program list as the test target.

The first technique executes only errors positioned on an execution path of a program executed by the test data. This is to detect only error programs satisfying the above-described condition "① an error code is required to be executed". This technique is simple to implement.

A specific configuration and process with respect to an error program test technique through execution path analysis will be respectively described with reference to FIGS. 2 and 4.

The second technique filters and executes only errors having different intermediate execution result values of a corresponding program. This is to detect only error programs satisfying the above-described condition "② an intermediate state of the program is required to be changed by an error code execution result".

In the present invention, an integrated error program (IEP) that inserts error codes into an original program and executes it in one operation is generated in order to check the intermediate execution result values of the program. When an error code is generated with respect to expressions within the program, the IEP replaces the corresponding expression with a function of executing the original code and the error code in one operation to compare the execution results.

A specific configuration and process with respect to the error program test technique using the IEP will be described below with reference to FIGS. 3, 5, and 6.

Figure 2:
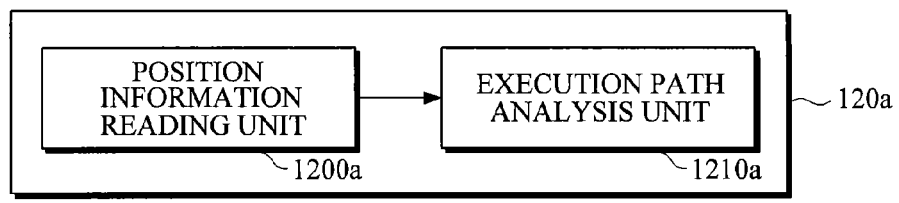
FIG. 2 is a configuration diagram of a preprocessing unit according to a preferred embodiment of the present invention.

FIG. 2 is a configuration diagram of a preprocessing unit 120*a* according to a preferred embodiment of the present invention.

Referring to FIGS. 1 and 2, the preprocessing unit 120*a* includes a position information reading unit 1200*a* and an execution path analysis unit 1210*a*.

The position information reading unit 1200*a* reads position information of error programs, test data, and error codes included in the error programs.

The execution path analysis unit 1200*a* ascertains an execution path by executing the test target program for each set of test data, detects an error program that has an error code positioned on the ascertained execution path, and excludes an error program that is not detected from the test target passed through the error program testing unit 122.

Figure 3:
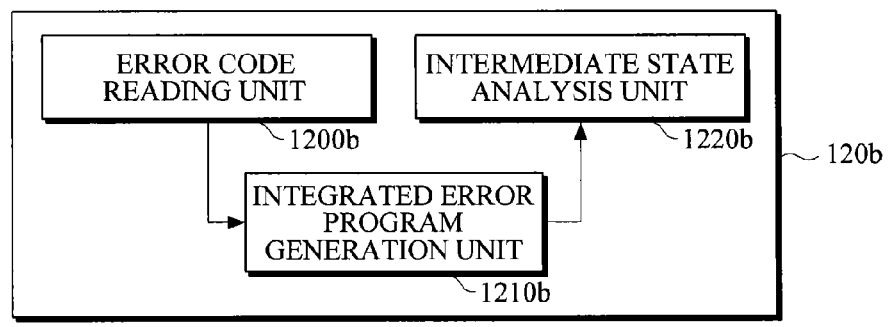
FIG. 3 is a configuration diagram of a preprocessing unit according to another preferred embodiment of the present invention.

FIG. 3 is a configuration diagram of a preprocessing unit 120*b* according to another preferred embodiment of the present invention.

Referring to FIGS. 1 and 3, the preprocessing unit 120*b* includes an error code reading unit 1200*b*, an integrated error program generation unit 1210*b*, and an intermediate state analysis unit 1220*b*.

The error code reading unit 1200*b* reads list information of the error programs, the test data, and error codes included in the error programs.

The integrated error program generation unit 1210*b* generates an integrated error program (IEP).

The intermediate state analysis unit 1220*b* executes the IEP for each set of test data, detects an error program in which intermediate execution results of an original code and an error code differ, and excludes an error program that is not detected from a test target passed through the error program testing unit 122.

The IEP is a program that outputs the intermediate execution results of the original code and the error code when the error code is inserted into the test target program and the original code and the error are executed, and returns the result of the original code as a result value.

Figure 4:
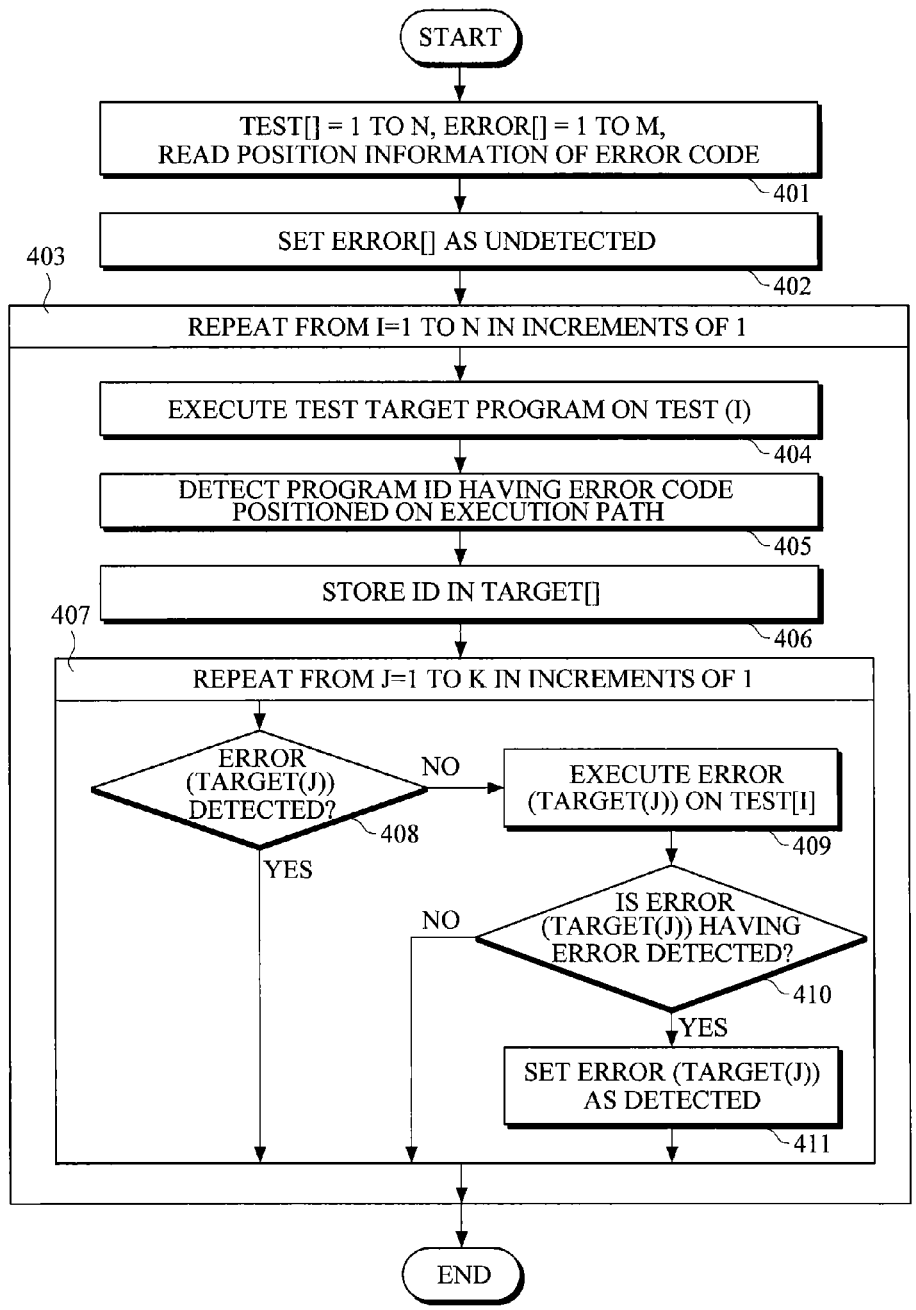
FIG. 4 is a flowchart illustrating an error-based program testing method through execution path analysis according to a preferred embodiment of the present invention.

FIG. 4 is a flowchart illustrating an error-based program testing method through execution path analysis according to a preferred embodiment of the present invention.

Referring to FIGS. 1 and 4, in operation 401, the testing apparatus 1 reads position information of error programs, test data, and error codes included in the error programs. In FIG. 4, N-number of pieces of test data and M-number of error programs are read in arrays of test[ ] and error[ ].

In operation 402, the error programs are initially set as being undetected which corresponds to a state in which errors are not detected.

Next, in operation 404, the testing apparatus 1 obtains execution path information by executing the test target program with respect to the read test data.

Next, in operation 405, the testing apparatus 1 detects ID values of error programs having error codes positioned on the corresponding execution path.

In operation 406, in FIG. 4, K-number of error programs are identified, and ID values of the error programs are stored in an array of target [ ]. Since the execution path is different for each set of test data, K, which denotes the number of the error programs on the corresponding execution path, has different values.

Next, in operations 408 and 409, the testing apparatus 1 executes error(target(j)) with respect to test[i] when the error program corresponding to the ID value stored in the target [ ] array is set as being undetected.

When the error program is detected by the test data in operation 410, the error program is set as being detected in operation 411, and is excluded from execution of the error program test in the future.

In operation 407, all processes from operation 408 to operation 411 are repeatedly executed with respect to each of target error programs 1 to K.

In addition, in operation 403, processes from operation 404 to operation 411 are repeatedly executed with respect to each of the test data 1 to N.

FIG. 5 is a reference diagram illustrating a pseudo-code of a SerialAOR function according to a preferred embodiment of the present invention.

In FIG. 5, in the IEP, the way in which an expression is replaced with a function of executing an original code and an error code in one operation to compare the results is shown.

Error codes which can be generated in original code "C=A−B" may correspond to the following four cases:

$$\square C=A+B, \square C=A*B, \square C=A/B, \text{ and } \square C=A \% B$$

In order to compare the results of the above four error codes and the original code, the IEP may change the original code "C=A−B" into a function call in which operands of the original code are input as parameters such as "C=SerialAOR(A, B,MINUS)" FIG. 5 shows the pseudo-code of the SerialAOR function.

As shown in FIG. 5, the SerialAOR function returns the result of the original code as the result value. Accordingly, in the end the IEP operates like the original program.

However, the error codes are executed within the SerialAOR function, the intermediate results of the original code and the error code are compared, and the ID value of the corresponding error program is reported when the intermediate results are different.

Figure 6:
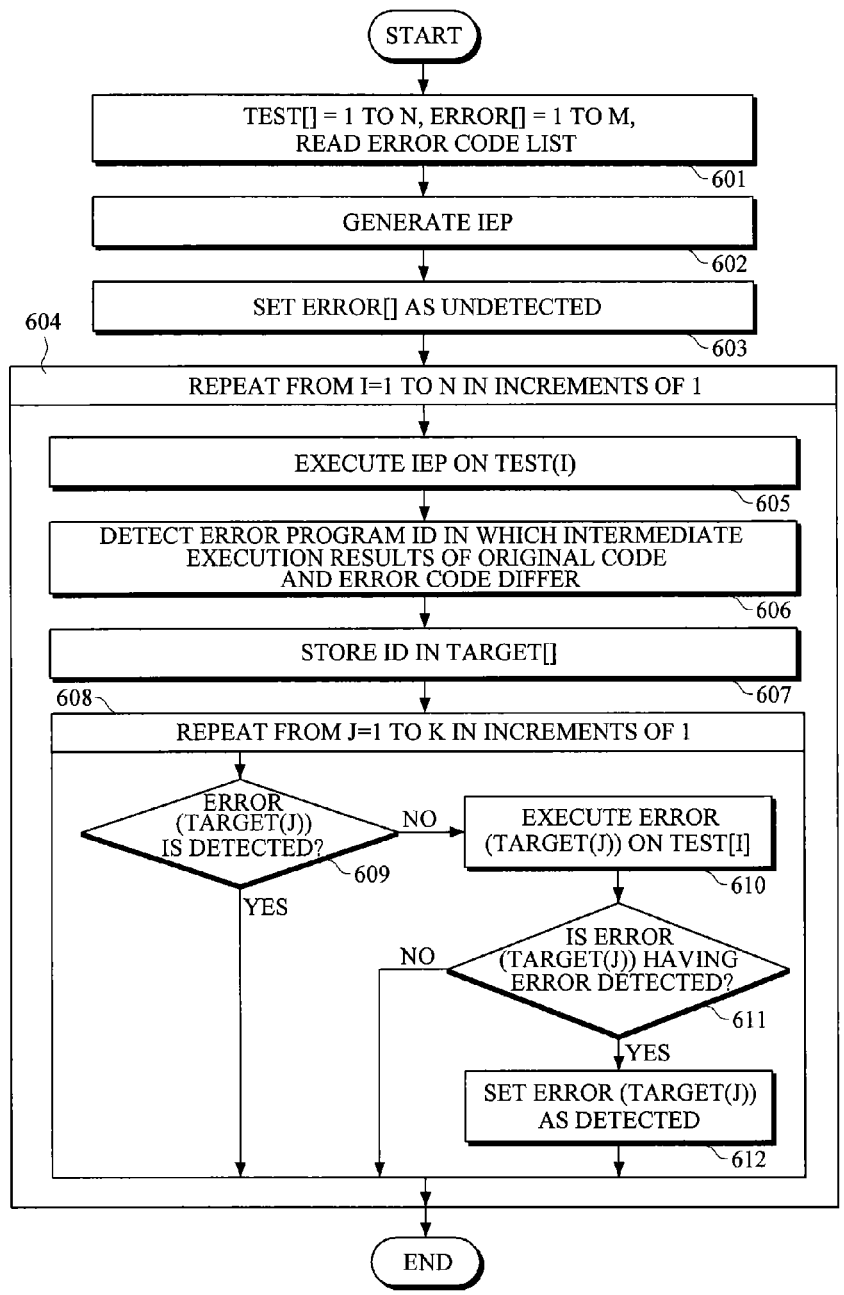
FIG. 6 is a flowchart illustrating an error-based program testing method through intermediate state comparison according to another preferred embodiment of the present invention.

FIG. 6 is a flowchart illustrating an error-based program testing method through intermediate state comparison according to another preferred embodiment of the present invention.

Referring to FIGS. 1 and 6, in operation 601, the testing apparatus 1 reads list information of error programs, test data, and error codes included in the error programs. In FIG. 6, N-number of pieces of test data and M-number of error programs are read in arrays of test[ ] and error[ ].

Next, in operation 602, the testing apparatus 1 generates an IEP in which all of the error codes are inserted into a test target program to thereby compare intermediate results of the error codes.

In operation 603, all of the error programs are initially set as being undetected, which is a state in which errors are not detected.

Next, in operation 605, the testing apparatus 1 executes the IEP with respect to the read test data.

In operation 606, the testing apparatus 1 detects ID values of the error programs in which intermediate execution results of an original code and an error code differ by the IEP, and in operation 607, stores the detected ID values of the error programs.

In FIG. 6, when ID values of execution target error programs are detected, the detected ID values are stored in an array of target[ ]. Since the execution path is different for each set of test data, K, which denotes the number of the error programs on the corresponding execution path, has different values.

Next, in operations 609 and 610, the testing apparatus 1 executes error(target(j)) with respect to test[i] when the error program corresponding to the ID value stored in the array of target[ ] is set as being undetected. When the error program is detected by the test data in operation 611, the corresponding error program is set as being detected in operation 612 and excluded from execution of the error program test in the future.

In operation 608, all processes from operation 609 to operation 612 are repeatedly executed with respect to each of target error programs 1 to K.

In addition, in operation 604, processes from operation 605 to operation 612 are repeatedly executed with respect to each of the test data 1 to N.

According to an embodiment, error programs which are not associated with test data are detected in advance, and test execution with respect to the error programs which are not associated with the test data is prohibited. Accordingly, the number of test executions with respect to unnecessary error programs is reduced, thereby reducing test execution time and costs.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An error-based program testing apparatus, comprising:
an error program generation unit that generates error programs by adding errors to a test target program;
a preprocessing unit that selects a test target error program associated with test data among the generated error programs using error information obtained through the addition of the errors; and
an error program testing unit that receives the test data and executes the test target error program to thereby test for presence/absence of the errors,
wherein the preprocessing unit comprises:
a position information reading unit that reads position information of the error programs, the test data, and error codes included in the error programs; and
an execution path analysis unit that ascertains an execution path by executing the test target program for each set of test data, detects an error program that has an error code positioned on the ascertained execution path, and excludes an error program that is not detected from the test target passed through the error program testing unit.

2. An error-based program testing apparatus, comprising:
an error program generation unit that generates error programs by adding errors to a test target program;
a preprocessing unit that selects a test target error program associated with test data among the generated error programs using error information obtained through the addition of the errors; and
an error program testing unit that receives the test data and executes the test target error program to thereby test for presence/absence of the errors,
wherein the preprocessing unit comprises:
an error code reading unit that reads list information of the error programs, the test data, and error codes included in the error programs;
an integrated error program generation unit that generates an integrated error program; and
an intermediate state analysis unit that executes the integrated error program for each set of test data, detects an error program in which intermediate execution results of an original code and an error code differ, and excludes an error program that is not detected from a test target passed through the error program testing unit.

3. The error-based program testing apparatus according to claim 2, wherein the integrated error program is a program that outputs the intermediate execution results of the original code and the error code when the error code is inserted into the test target program and the original code and the error are executed, and returns the result of the original code as a result value.

4. A testing method of an error-based program testing apparatus, the testing method comprising:
generating error programs by adding errors to a test target program;
selecting a test target error program associated with test data among the generated error programs using error information obtained through the addition of the errors; and
receiving the test data and executing the test target error program to thereby test for presence/absence of the errors,
wherein the selecting of the test target error program comprises:
reading position information of the error programs, the test data, and error codes included in the error programs;
ascertaining an execution path by executing the test target program for each set of test data; and
detecting an error program that has an error code positioned on the ascertained execution path and excluding an error program that is not detected from the test target.

5. A testing method of an error-based program testing apparatus, the testing method comprising:
generating error programs by adding errors to a test target program;
selecting a test target error program associated with test data among the generated error programs using error information obtained through the addition of the errors; and
receiving the test data and executing the test target error program to thereby test for presence/absence of the errors,
wherein the selecting of the test target error program comprises:
reading list information of the error programs, the test data, and error codes included in the error programs;
generating an integrated error program;
executing the integrated error program for each set of test data and detecting an error program in which intermediate execution results of an original code and the error code differ; and
excluding an error program that is not detected from the test target.

6. The testing method according to claim 5, wherein the integrated error program is a program that outputs the intermediate execution results of the original code and the error code when the error code is inserted into the test target program and the original code and the error are executed, and returns the result of the original code as a result value.

* * * * *